April 15, 1958     L. D. PALMER     2,831,177
DELAY LINE FOR HYDROPHONES
Filed Oct. 1, 1956
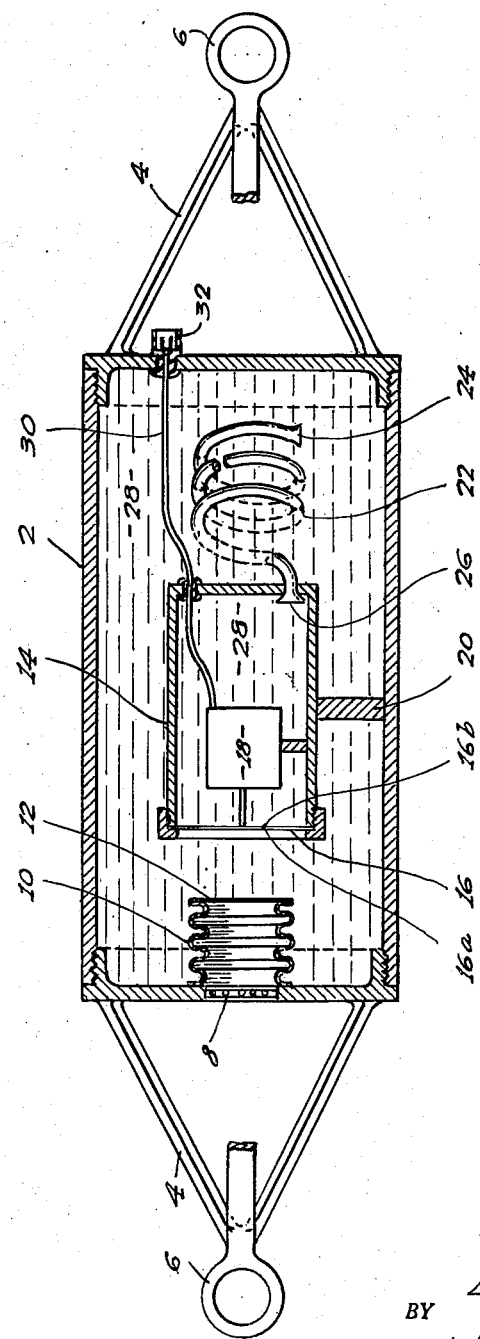
INVENTOR.
Loyal D. Palmer.
BY
ATTORNEY

2,831,177
DELAY LINE FOR HYDROPHONES

Loyal D. Palmer, Oakmont, Pa., assignor to Gulf Research & Development Company, Pittsburgh, Pa., a corporation of Delaware Application October 1, 1956, Serial No. 613,150

6 Claims. (Cl. 340—17)

This invention concerns an electro-acoustic apparatus for detecting sound waves in water. The invention is particularly adaptable for use in marine seismic operations such as are conducted to locate possible oil-producing structures on the continental shelf.

It has been found that in conducting geophysical seismic prospecting operations in water-covered areas, satisfactory results may be obtained by employing hydrophones which take the place of seismometers used in conventional seismic operations on land. The seismic waves manifest themselves in the water layer as pressure waves whose frequency corresponds to that of the seismic wave in the earth underlying the water bottom. A variety of known techniques may be employed to position the hydrophone at appropriate locations behind a recording boat and at an optimum water depth which depends on a variety of conditions.

It is an object of this invention to provide a hydrophone for geophysical seismic operations, which hydrophone is housed in a substantial protective case and which does not require any specific orientation, and which is automatically compensated for variations in depth of submergence in the water. The hydrophone of this invention is furthermore free from leakage of sea water and is advantageous in being capable of operation at the low frequencies generally encountered in geophysical seismic operations.

In the heretofore-known hydrophones the compensation for variations in depth of submergence is effected by employing a small leak of high acoustical impedance to permit access of static fluid pressure to the back surface of the acoustical diaphragm while effectively attenuating the acoustic wave, such structure being illustrated for example in U. S. Patents 2,405,179 and 2,429,104. In such devices only the front surface of the acoustic diaphragm is acted upon by the acoustic wave because the high acoustic impedance effectively isolates the back surface of the diaphragm from the acoustic wave.

In the present invention both the front surface and the back surface of the acoustical diaphragm are acted upon by the acoustic wave in such manner that the eventual resultant diaphragm displacement is substantially greater than it is when the wave has access only to the front surface of the diaphragm as in prior-art devices. The increased response is obtained in this invention by providing access of the acoustic wave to the back surface of the acoustic diaphragm only through an acoustic delay tube. The delay tube imparts a phase lag to the acoustic wave reaching the back surface of the acoustic diaphragm, so that subsequent to the initial onset of the wave the diaphragm will move under the resultant pressure of the combined acoustic waves. By making the delay tube of such length as to impart a delay of between one-fourth and three-fourths wave length to the acoustic wave impinging on the back surface of the acoustic diaphragm, the resultant pressure on the diaphragm for the second and each succeeding pulse of a wave is greater than it would be with no acoustic wave at all on the back surface of the diaphragm as in prior-art devices.

The hydrophone of this invention comprises a closed outer case of substantial strength and wear resistance, and having a sound-transparent window which is conveniently also adapted to permit changes in the volume of the case to occur. A second container having rigid walls is located entirely inside the outer case and is closed at one end by an acoustic diaphragm whose deflections actuate an electro-acoustic transducer. The space inside the second container is acoustically connected to the space between the outer case and the second container via a rigid-walled conduit of substantial length which forms an acoustic delay tube. The space between the two containers, the second (inner) container, and the conduit are entirely filled with a compressible liquid. The length of the conduit is made between one-fourth and three-fourths of the wave length of sound in the compressible liquid for the seismic frequencies to be detected.

In the drawing, there is shown a diagrammatical cross section showing the structure of the hydrophone of this invention.

Referring to the drawing there is shown an outer case 2 which may be made of material not readily attacked by sea water and of sufficient strength to resist the shocks, wear, and other abuse incidental to marine seismic operations. If desired the ends of the case may be equipped with streamlined arms, as shown for example by 4 in the drawing and may have eyes 6 for attaching to a cable, streamer, buoy or other similar devices customarily employed. The case 2 has a sound-transparent window 8 which may conveniently be in the form of a metallic bellows whose inner end is closed by a thin sheet of metal 12. By this means the volume inside the case 2 may vary through extension and contraction of the bellows, or conversely a material filling the inside of the case may expand or contract as it is subjected to changes in temperature, pressure, etc. Alternatively the window 8 may comprise a rubber bellows or flexible rubber diaphragm, and for this purpose it is preferred to use a rubber having the same sound hardness as sea water, such rubber being known as "$\rho c$" rubber. Such material is substantially transparent to acoustic waves in the water. If desired, a coarse protective screen may be placed over the window 8 to protect the window from mechanical damage.

Inside the case 2 is an open-ended container 14 which may be fastened to the outer case as by pedestal 20 or other convenient means. The open end of the container 14 is covered by a diaphragm 16 which serves as an acoustic membrane to be vibrated by pressure waves in the ambient liquid surrounding the case 2. The side walls of the container 14 are made relatively stiff compared to the diaphragm so that little or no acoustic wave passes through the side walls of container 14. Container 14 may be made of metal, rigid plastic, or other rigid material. An electro-acoustic transducer 18 in the apparatus is effectively connected to the diaphragm 16 so as to be actuated by motion of the diaphragm 16. The transducer 18 is shown in Figure 1 as mounted inside the container 14 but the transducer 18 may alternatively be mounted on the case 2 outside of the container 14. Electrical leads 30 connect transducer 18 to an external connection plug 32 to which a cable (not shown) may be connected. Appropriate fluid-tight seals are provided where the leads 30 pass through the wall of the container 14 and the wall of the outer case 2 respectively.

A conduit 22 made of material which provides high wall rigidity has one end accoustically connected to the space inside the container 14 and the other end acoustically connected to the space between the containers 2 and 14. The conduit 22 forms an acoustic delay tube and forms the path by which the acoustic wave may enter the container 14 with relatively little attenuation. The tube 22 has relatively rigid walls compared to the stiffness of the diaphragm 16. The tube 22 may be made of metal, glass, rigid plastic or the like. A one quarter inch diameter copper tube has been found satisfactory. The conduit 22 may be physically open ended as at 24 and 26, or one or both ends may be closed by acoustically-transparent means such as "ρc" rubber (not shown) which does not interfere with the entrance or exit of acoustic energy in the conduit 22 and being flexible also permits pressure communication between the interior of case 2 and container 14.

The entire free space inside the case 2, including all available space inside the container 14 and the space inside the conduit 22, is filled with a liquid 28, preferably one having good electrical insulation qualities and having high compressibility. If one or both ends of the delay tube 22 are closed by an acoustically-transparent means, then different liquids may be used in the several parts.

In operation, the seismic wave in the ambient liquid (e. g. sea water) surrounding the case 2 in the form of a low-frequency pressure wave will be communicated to the interior liquid 28 by transmission through the window 8. The wave impinges on the front surface 16a of diaphragm 16 tending to deflect the same and actuate the transducer 18. The sound wave in the interior liquid 28 can reach the back surface 16b of the diaphragm only by transmission through the liquid in conduit 22. The conduit 22 is made to have a substantial length so that it takes an appreciable time for the acoustic wave to traverse the liquid within the conduit 22 whereby the conduit 22 forms an acoustic delay tube. If the delay suffered by the acoustic wave in traversing the liquid in tube 22 is less than one-fourth wave length, the acoustic wave will exert a back pressure on the back surface 16b of the diaphragm. In accordance with the teachings of the present invention the conduit 22 is made to have a length of from one-fourth to three-fourths of the wave length of sound in the liquid in tube 22 for the seismic frequencies encountered. In the case of seismic wavelets due to transient disturbances (e. g. dynamite explosion) one-half wave length is defined as the distance between the peak of the wavelet and the following trough of the wavelet. By making the conduit 22 of a length between one-fourth and three-fourths of a wavelet, the sound wave in the interior liquid 28 will reach the back surface 16b of the diaphragm delayed by a phase angle exceeding 90° but less than 270°, and hence motion of the diaphragm 16 will be augmented, thus increasing the sensitivity of the device.

For the interior liquid it is advantageous to use a liquid silicone as for example DC200 fluid made by Dow Corning Corporation. This material acts as a good electrical insulator and at the same time has a favorable sound velocity, namely 2960 feet per second. Care must be taken when filling the cases 2 and 14 to be sure that all available inside space including the conduit 22 is completely filled with this fluid and that no air is trapped in the containers or tube 22. Air bubbles must be avoided and this may be done by conventional methods as for example by the application of vacuum in well-known manner or by using suitably-located filling plugs. Inasmuch as the silicone fluid is electrically insulating it is advantageous to have this also fill the interior of transducer 18, since otherwise the transducer case itself must be made rigid.

The frequencies encountered in seismic operations on the continental shelf lie in the range 30 to 60 cycles per second. With a velocity of sound in the silicone liquid of 2960 ft./sec. the conduit 22 should advantageously have a length of from about 25 feet to about 35 feet. The outer and inner ends of the conduit may be open and flared as shown at 24 and 26 and the tube 22 may be coiled inside the case 2 in any convenient manner. By way of example, a length of 25 feet for the conduit 22 when filled with DC200 fluid provides a phase delay of about ¼ wave length at 30 cycles and ½ wave length at 60 cycles. If the frequency of the seismic waves in the areas being surveyed is known, the conduit 22 is preferably adjusted to ½ wave length for optimum results at the desired frequency. Inasmuch as the seismic waves may vary in frequency in different areas in which the apparatus is to be used, it is preferred to employ a length of conduit between ¼ wave length in the conduit liquid for the lowest frequencies and ¾ wave lengths in the conduit liquid for the highest frequencies to be detected. When DC200 fluid is used this length is in the neighborhood of 30 feet for seismic frequencies.

The electro-acoustic transducer 18 is shown only diagrammatically in the drawing and may comprise any known type of transducer such as a coil moving in a magnetic field, variable-area reluctance-bridge type devices, etc. In the drawing, a mechanical connection is shown between the transducer 18 and the diaphragm 16, but the transducer may act directly on a magnetic diaphragm for example as is done in a variable-air-gap (telephone receiver) type of transducer. The diaphragm 16 must of course be sufficiently flexible to be displaced by the sound waves in the interior liquid 28.

It is apparent also that numerous seals, gaskets, etc. in the container 14 and in case 2 to prevent leakage are required and these are well known to those skilled in the art and are not shown on the figure. The interior of container 14 is substantially isolated acoustically from the space between container 14 and case 2 except for transmission through the acoustical delay tube 22. The case is entirely sealed so as to prevent entrance of external sea water. The bellows 10 permit volume changes to take place without destroying the seal of case 2. These volume changes occur as a result of temperature changes and compression of the interior liquid when the device is used at greater water depths, as well as the momentary compression incidental to the transmission of sound waves. Compensation of static pressures on the two sides of the diaphragm occurs through the conduit 22 whereas the acoustic delay effect of the conduit 22 produces an increased sensitivity for acoustic waves of desired frequency.

What I claim as my invention is:

1. A hydrophone comprising a first sealed container at least a portion of whose wall is sound transparent, a second container inside said first container and having rigid walls, a diaphragm covering an opening in the wall of said second container, a rigid-walled conduit providing pressure communication between the interior of said second container and the interior of said first container, an electromechanical transducer actuated by said diaphragm, and a liquid filling the interior of said first container, said second container, and said conduit, and said conduit having a length of between one-fourth and three-fourths wave length for sound of desired frequency in said filling liquid.

2. A hydrophone comprising a first sealed container at least a portion of whose wall is sound transparent and is adapted to permit changes in volume of said container to occur, a second container inside said first container and having rigid walls, a diaphragm covering an opening in the wall of said second container, a rigid-walled conduit providing pressure communication between the interior of said second container and the space between said first and second containers, an electromechanical transducer actuated by said diaphragm, and a liquid filling the interior of said first container, said second container, and said conduit, and said conduit having a length of between one-fourth and three-fourths wave length for sound of desired frequency in said filling liquid.

3. A hydrophone comprising a first sealed container at least a portion of whose wall is sound transparent, a second container inside said first container and having an opening covered by a flexible diaphragm, pressure deformation of the walls of said second container producing a lesser change in the volume of said container than pressure deformation of the diaphragm, an open-ended conduit providing acoustic communication between the interior of said second container and the interior of said first container, pressure deformation of the walls of said conduit producing a lesser change in the volume of said conduit than pressure deformation of the diaphragm, an electromechanical transducer actuated by said diaphragm, and a liquid filling the interior of said first container, said second container, and said conduit, said conduit having a length of between one-fourth and three-fourths wave length for sound of desired frequency in said filling liquid.

4. A hydrophone comprising a first sealed container at least of portion of whose wall is sound transparent, a second container inside said first container whose walls resist the passage of sound and having an opening covered by a flexible diaphragm, an acoustical delay tube whose walls resist the passage of sound and providing a channel for longitudinal acoustical communication between the interior of said first container and the interior of said second container, an electro-acoustical transducer actuated by said diaphragm, a liquid filling said first container, a liquid filling said second container, and a liquid filling said delay tube.

5. A hydrophone comprising a first sealed container at least a portion of whose wall is sound transparent, a second container inside said first container whose walls resist the passage of sound and having an opening covered by a flexible diaphragm, an acoustical delay tube whose walls resist the passage of sound and providing a channel for longitudinal acoustical communication between the interior of said first container and the interior of said second container, an electro-acoustical transducer actuated by said diaphragm, and a liquid filling said first container, a liquid filling said second container, and a liquid filling said delay tube, said delay tube being of a length which provides a delay of between one-fourth and three-fourths wave length for the desired frequency in said liquid filling said delay tube.

6. A hydrophone comprising a first sealed container at least a portion of whose wall is sound transparent, a second container inside said first container and having an opening covered by a flexible diaphragm, pressure deformation of the walls of said second container producing a lesser change in the volume of said container than pressure deformation of the diaphragm, a conduit providing acoustic communication between the interior of said second container and the interior of said first container, pressure deformation of the walls of said conduit producing a lesser change in the volume of said conduit than pressure deformation of the diaphragm, an electromechanical transducer actuated by said diaphragm, a liquid filling said first container, a liquid filling said second container, and a liquid filling said conduit, said conduit having a length of between one-fourth and three-fourths wave length for sound of desired frequency in said liquid filling said conduit.

References Cited in the file of this patent

UNITED STATES PATENTS

| | | |
|---|---|---|
| 2,404,784 | Bostwick | July 30, 1946 |
| 2,405,179 | Black | Aug. 6, 1946 |